Dec. 9, 1958  R. L. JAESCHKE  2,863,538
PERMANENT MAGNET SEAL
Filed Oct. 22, 1954

INVENTOR.
RALPH L. JAESCHKE
BY
*McDonald & Feagre*
ATTORNEYS

United States Patent Office 2,863,538
Patented Dec. 9, 1958

2,863,538

PERMANENT MAGNET SEAL

Ralph L. Jaeschke, Kenosha, Wis., assignor to Eaton Manufacturing Company, Cleveland, Ohio, a corporation of Ohio Application October 22, 1954, Serial No. 463,878

2 Claims. (Cl. 192—21.5)

The present invention relates to electromagnetic clutches, brakes, dynamometers and the like apparatus and more particularly to sealing means therefor.

Broadly, the present invention comprehends the provision of a sealing means particularly adapted for electromagnetic apparatus such as clutches, brakes, dynamometers and the like, utilizing finely divided or powdered magnetic materials, effective to retain the magnetic components of the material within the operating confines of the apparatus.

With the use of increasing sizes of electromagnetic machines employing magnetic powders over prolonged periods of time, it becomes increasingly important to provide sealing means that are more effective in preventing escape of the powder from the operating confines of the machine. Loss of the powders impairs performance of the apparatus in that the amount of coupling ingredient is diminished, requiring greater excitation of the flux producing coil to maintain the output torque and in that the escaped powders cause an objectionable abrasion of wearing parts such as bearings. Attempts to prevent such leakage by the use of various seals have not been completely successful.

The magnetic powders employed in clutches and the like apparatus consist primarily of magnetic components and have intermixed therewith certain non-magnetic components to impart some desirable property to the magnetic material such as to render it anti-sintering or non-hygroscopic. Accordingly, a seal particularly adapted to effectively retain magnetic components of magnetic material within the operating confines of the clutch is a marked improvement in the development of clutch seals.

According to the present invention, a magnetic seal is provided between a pair of relatively movable members. The seal comprises preferably a plurality of permanent magnets disposed on one of the members so as to provide a serial magnetic path through each of the magnets, cooperating portions of each of the members and the air gap between the members. Particles of magnetic material that may have escaped from the operating chambers of the clutch through a preliminary seal and tending to pass between the members at the seal are entrained in the magnetic field and prevented from further escape.

Since permanent magnets of small size requiring no power source or other additional equipment are employed in the present device, a simple, effective, and cheap seal is provided.

It is, of course, to be understood that the present invention may be employed in virtually any arrangement wherein it is desired to prevent the passage of magnetic particles between a pair of spaced members and wherein it is not objectionable to employ a magnetic field.

It is an object of this invention to provide a seal in an electromagnetic apparatus for retaining magnetic powdered material within the operating confines of the apparatus.

It is another object of this invention to provide a seal in an electromagnetic apparatus that is simple of design, inexpensive of construction, operation, and maintenance and effective to retain magnetic powdered material within the confines of the apparatus.

It is another object of this invention to provide a seal in an electromagnetic apparatus that employs a novel means particularly adapted for preventing escape of magnetic component particles of magnetic material.

It is still another object of this invention to employ a pair of permanent magnets in a seal for an electromagnetic apparatus for cooperating with members of the apparatus to prevent escape of magnetic particles from within the apparatus.

Other objects and advantages of this invention will appear from the following detailed description taken in connection with the accompanying drawing wherein.

Figure 1:
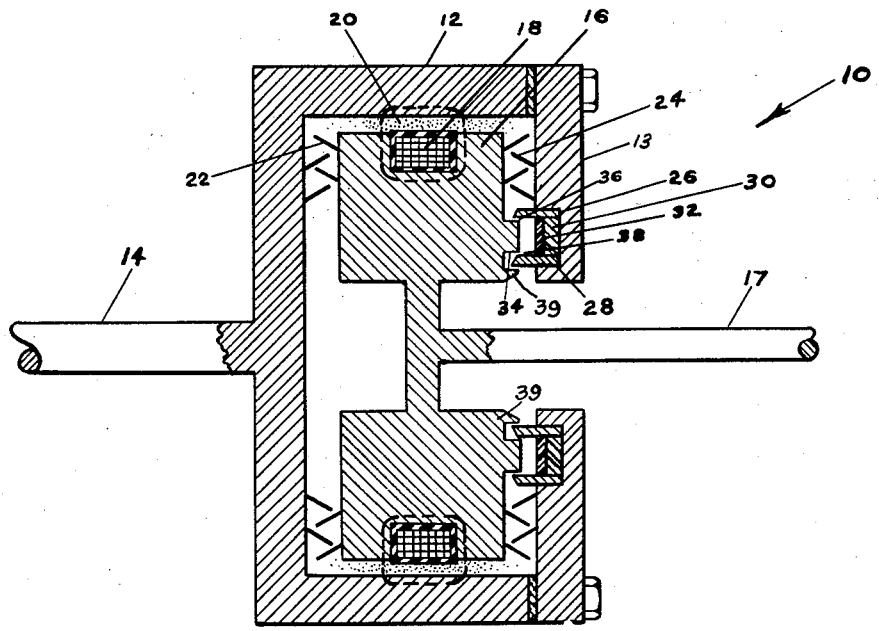
Fig. 1 is a schematic representation of a clutch or the like apparatus having a seal according to the present invention applied thereto.

Referring now more particularly to Fig. 1 of the drawing for a detailed description of this invention, 10 represents generally an electromagnetic clutch apparatus having a magnetic input member 12 connected to and rotatable with an input shaft 14. Input member 12 has bolted thereto a circular member 13 made of some non-magnetic material such as aluminum for a purpose to be made clear hereinafter. Input member 12 is generally toroidal in shape and has mounted therewithin an output member 16 rotatable with an output shaft 17 and having mounted in an annular recess therein an electromagnetic coil 18 for providing the coupling flux between the members. Magnetic material 20 is located between the members and is responsive to the magnetic field for coupling the input and output members for unitary rotation. A pair of labyrinth seals 22 and 24 are provided between members 12 and 16 at the ends thereof.

Figure 2:
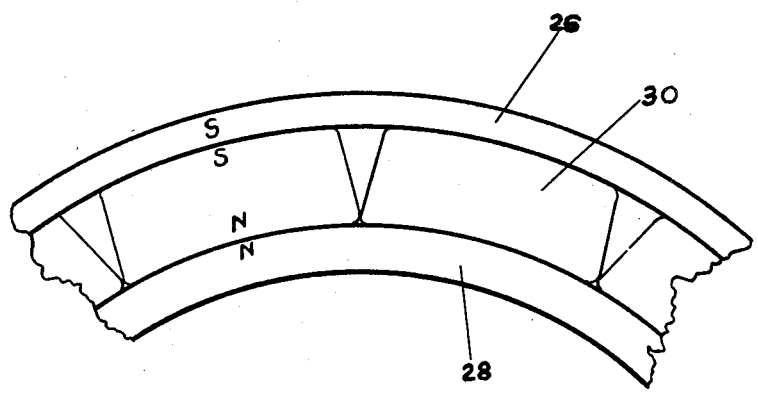
Fig. 2 is a detail side view of the permanent magnet and ring assembly of Fig. 1.

According to a feature of this invention, a pair of radially spaced concentric steel rings 26 and 28 are embedded in the non-magnetic member 13 and are spaced by a series of circumferentially spaced "index" steel blocks 30, as shown more clearly in Fig. 2. The index blocks are magnetized after the described parts have been assembled and a certain rigidity is afforded the assembly by an epoxy resin 32 poured into a portion of the space between the rings while lying flat.

In cooperation with rings 26 and 28 is an annular protuberance 34 extending axially from output member 16 between the ends of rings 26 and 28. Rings 26 and 28 along with block 30 and protuberance 34 comprise a closed magnetic path having a pair of gaps 36 and 38. Annular ring 39 disposed radially inwardly of ring 28 serves together with the magnetic flux generated by magnetic blocks 30 to form a secondary seal to that provided by protuberance 34 and rings 26 and 28. The magnetic flux path for this seal takes the general path from ring 28, to ring 39, and thence from protuberance 34 to ring 26.

It is readily understood that any magnetic particles of material 20 that may have escaped from the space between the sides of the input and output members through labyrinth seal 24 are inhibited from further movement between the members by reason of the fact that they are entrained in the magnetic field present in the gaps 36 and 38.

It is to be understood that a seal according to the present invention may be incorporated to seal virtually any pair of relatively movable members and is not limited to use in clutches of the above description.

While the present invention has been depicted and described with reference to a particular embodiment thereof, it is manifest that it is susceptible to many changes and modifications without departing from its spirit and scope.

Accordingly, it is intended to comprehend all such changes and modifications in the appended claims.

What I claim is:

1. In an electromagnetic apparatus comprising a pair of relatively rotatable members having a powdered magnetic material located therebetween, means providing a magnetic field between said members, sealing means between said members including a pair of spaced magnetic rings mounted on one of said members and defining an annular space therebetween, permanent magnet means disposed in said annular space and carried by said one member contiguous to said spaced rings and forming a base portion of a U-shaped flux path in said spaced rings and said magnet means, a pair of spaced magnetizable ring portions on the other of said members and disposed in overlapping relationship with said magnetic rings and forming air gaps therebetween, said permanent magnet means providing a magnetic flux traversing said rings, said ring portions and said air gaps to provide a mechanical and a magnetic seal, thus preventing escape of the powdered magnetic material from within the apparatus.

2. In an electromagnetic apparatus comprising a pair of relatively rotatable members having a powdered magnetic material located therebetween, means producing a magnetic field between said members, sealing means between said members including a pair of radially spaced, axially extending, annular, magnetic protuberances mounted on each of said members and defining an opening therebetween, one protuberance on one of said members disposed in axial, overlapping relation and in radial proximity with one protuberance on the other of said members and forming a gap therebetween, the other protuberance on one of said members disposed in axial overlapping relation and in radial proximity with the other protuberance on the other of said members and forming a gap therebetween, and permanent magnet means located in said opening and providing magnetic flux flowing in said magnet means in a radial direction and traversing said protuberances and said gaps whereby said magnetic material is retained in the apparatus by said sealing means.

References Cited in the file of this patent

UNITED STATES PATENTS

| | | |
|---|---|---|
| 2,519,449 | Findley | Aug. 22, 1950 |
| 2,557,140 | Razdowitz | June 19, 1951 |
| 2,713,927 | Rabinow | July 26, 1955 |
| 2,718,946 | Winther | Sept. 27, 1955 |

FOREIGN PATENTS

| | | |
|---|---|---|
| 1,007,372 | France | Feb. 6, 1952 |

OTHER REFERENCES

Magnetic Fluid Clutch, Reprint Paper 48-238 AIEE Transactions, Dec. 13, 1948, vol. 67, 1948.